Patented Apr. 8, 1941

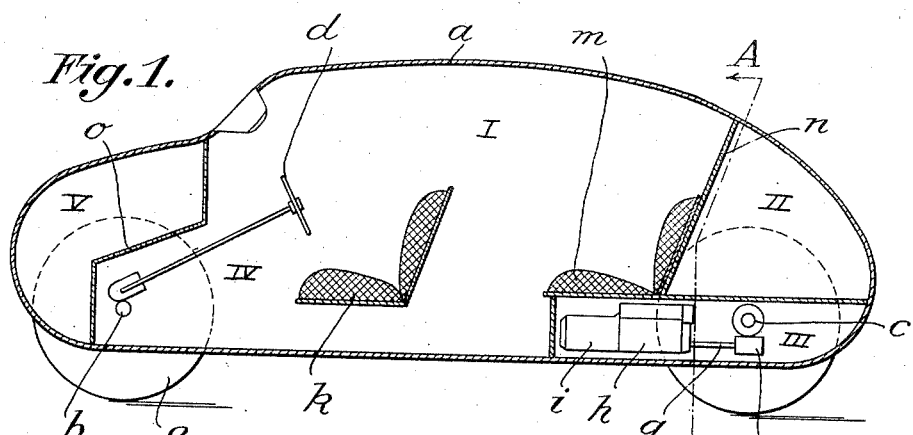
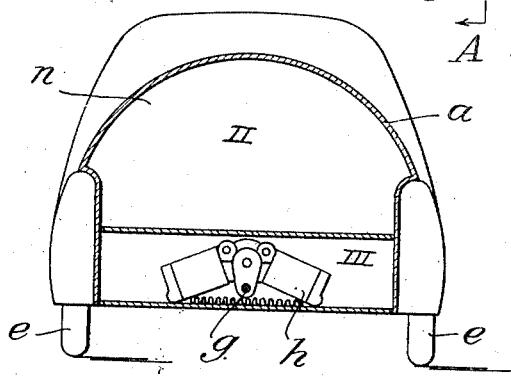
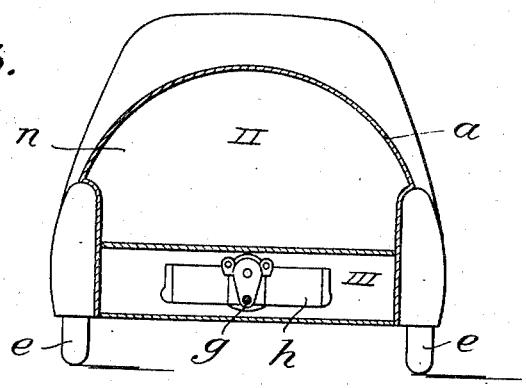

2,237,369

UNITED STATES PATENT OFFICE 2,237,369

REAR ENGINE VEHICLE

Wilhelm Seyerle, Waldenbronn, near Esslingen-on-the-Neckar, Germany, assignor to Daimler-Benz Aktiengesellschaft, Stuttgart-Unterturkheim, Germany Application November 24, 1937, Serial No. 176,159
In Germany April 1, 1935

15 Claims. (Cl. 180—54)

This invention relates to a rear engine vehicle and more particularly to the body for such a vehicle; it is a continuation-in-part of my co-pending application Serial No. 89,516, filed July 8, 1936, now Patent No. 2,138,618, issued on November 29, 1938.

Accordingly, the general object of this invention is the provision of an improved vehicle in which the engine is located in the rear thereof.

Another object of this invention is the provision of an improved vehicle body in which the engine is located in the rear thereof.

A further object of this invention is the provision of a vehicle body having the usual streamlined contour but containing an unusual amount of useful space for the passengers and accessories.

A still further object of this invention is the provision of an improved vehicle in which the engine and the transmission are situated below and rearwardly of the rear seats of the vehicle.

A more specific object of this invention is the provision of a motor vehicle having communicating control and passenger compartments between the axles, a motor and transmission compartment below and rearwardly of the rear passenger seats, a baggage compartment rearwardly of the rear passenger seats and above the portion of the motor and transmission compartment, and an accessory compartment extending above the front axle and in front of the control compartment.

These and other features of the invention will be best understood and appreciated from the following description of a preferred embodiment thereof, described for purposes of illustration and shown in the accompanying drawing in which:

Fig. 1 shows partially diagrammatically and partially in cross-section an improved vehicle embodying the features of this invention, Fig. 2 is a cross-sectional view along the line A—A of Fig. 1; and Fig. 3 is a cross-sectional view similar to Fig. 2 illustrating a slightly modified arrangement.

It will be seen from Fig. 1 that the vehicle has a body $a$ of a stream-lined configuration. The front and rear axles are respectively indicated at $b$ and $c$, the front axle $b$ being under control of the steering wheel $d$ and guiding the direction of the front wheels $e$. The rear axle $c$ is preferably driven from below by the gearing $f$ through the drive shaft $g$ of the engine $h$. As illustrated, the drive shaft $g$ is connected to the engine $h$ through the transmission $i$, the said drive shaft passing from the transmission through an open portion of the vehicle engine as will be explained later. The front and rear passenger seats are respectively indicated at $k$ and $m$, while $n$ and $o$ denote dividing partitions, the more detailed function of which is set forth below.

By the arrangement of the parts recited above and as shown in the drawing, the interior of the vehicle body is readily divided into four compartments. They are indicated on the drawing as I, the passenger compartment having an extension IV positioned in front of and communicating therewith and adapted to contain the vehicle control elements, II the baggage compartment, III the engine compartment, and V the accessory compartment. The intermediate wall $n$ separates the baggage and passenger compartments while the intermediate wall $o$ separates the control extension and accessory compartment. The control extension and passenger compartment are adapted to be completely communicating, while the engine compartment III is separated entirely from the passenger compartment I and the baggage compartment II.

In order to attain the arrangement described above, it will be noted that the vehicle engine and transmission have been mounted in the vehicle body beneath the rear passenger seats. Then, by having the engine drive shaft interconnected with the rear axle from below, all of these power elements are positioned out of the way and in such a low manner as to give the vehicle greater stability because of the low position of the center of gravity of these heavy masses, as emphasized in my said co-pending application.

While no particular type of engine is required to carry out the principles of this invention, I have found it extremely advantageous to use an engine in which the cylinders are positioned as an inverted V. This is the type of engine indicated in the embodiment shown on the drawing, and more particularly in Fig. 2. If this engine is used the drive shaft $g$ may then pass from the transmission $i$ to the gearing $f$ through the space formed by the V-positioned cylinders. The details of such an engine may be found in my said co-pending application, although I do not intend to limit myself to the exact constructions therein described. Other suitable types of engines may, of course, be used, such as those in which the cylinders are horizontal, and more particularly illustrated in Fig. 3. There is sufficient space for the engine to extend the entire width of the vehicle.

By means of this invention several advantages result which were not obtainable by prior art structures having the same body configuration. More useful space is provided by the arrangement according to this invention. The passenger, baggage, control and accessory compartments can be made larger for the same size of body. By positioning the engine under the rear seats, the engine can be closed in a tight compartment so that no oil fumes or smoke can penetrate the passenger space. By having an additional accessory compartment the tools and other accessories can all be kept therein and therefore, in making repairs upon the vehicle there is less likelihood of dirtying the interior of the vehicle.

It is obvious that variations may be made from the form of my invention described and illustrated. The body may be formed to have any desired outline and the exact division of the body interior shown need not be followed. It is to be understood that this invention is, therefore, not limited to the above described details, but that other forms thereof may readily be provided as will occur to those skilled in this art without departing from my invention as defined in the following claims.

I claim:

1. In a power vehicle, in combination, a substantially closed body structure, rear seats in said body, a space under said rear seats closed at the top by the bottom of said seats, at the front by the seat riser, and at the bottom and sides by the body, and open at the rear, and a motor and transmission positioned substantially wholly within said space.

2. The combination according to claim 1 in combination with a driving axle, and means extending rearwardly from said motor and transmission and engaging said axle from underneath for driving said axle from said motor.

3. In a power vehicle, in combination, a substantially closed, stream-lined body for said vehicle, front and rear seats in said body, and a driving motor and transmission located in said body substantially entirely beneath the rear seats.

4. In a power vehicle, in combination, a substantially closed, stream-lined body for said vehicle, front and rear seats in said body, a driving motor and transmission located substantially entirely beneath the rear seats, a driving axle, and means extending rearwardly from said motor and transmission and engaging said axle from underneath for driving said axle from said motor.

5. A power vehicle, front and rear axles for said vehicle, a body for said vehicle, front and rear seats in said body, driving means for said vehicle positioned below the rear seats and in front of the rear axle, partitions forming with said body a baggage compartment positioned over and behind the rear axle, and partitions forming with said body an accessory compartment in said body positioned over and in front of the front axle.

6. The combination according to claim 5 in which said driving means is a motor having its cylinders positioned as an inverted V, in combination with means for connecting the driving means to said rear axle from below.

7. The combination according to claim 5 in which said driving means is a motor having a horizontally positioned cylinders in combination with means for connecting the driving means to said rear axle from below.

8. A power vehicle, front and rear axles for said vehicle, a body for said vehicle, front and rear seats in said body, a motor having its cylinders arranged as an inverted V positioned beneath said rear seats, a transmission coupled to said motor, and a drive shaft connecting said transmission to the under portion of said rear axle and passing through the angular space formed by the inverted V cylinders.

9. The combination according to claim 1 in combination with a second space, the front of which is formed by the back of the rear seats and which extends rearwardly to the end of the vehicle body above said motor and transmission space.

10. In a power vehicle, in combination, a body, rear seats in said body, a space under said rear seats closed at the top by the bottom of said seats, at the front by the seat risers, and at the bottom and sides by the body, and open at the rear, a motor and transmission positioned in said space, said motor having a plurality of cylinders arranged in the form of an inverted V, a driving axle for said vehicle, and a driving shaft connected at one end to said transmission, passing through the space between the cylinder legs, and connected to said driving axle from below.

11. In a vehicle body including a floor and top, sides and ends of substantially streamlined configuration, a first partition extending from the top to the floor and transversely of the body near the front end thereof, the upper portion of said partition being positioned rearwardly of the lower portion, a second partition extending transversely of the body near the rear end thereof, said second partition having a portion rising from the floor of the vehicle, a substantially longitudinal portion extending rearwardly from the top of the first portion, and a third portion extending vertically to the vehicle roof from said horizontal portion, whereby said first and second partitions form between them a passenger and control compartment and said first partition and the front of said vehicle form an accessory compartment, seats in said passenger compartment, one of which is mounted on the horizontal portion of said second partition, and a third partition formed as an extension of the horizontal portion of said second partition, extending transversely of the vehicle and rearwardly to the end thereof, whereby a totally enclosed engine compartment is formed partially beneath the said vehicle seat, and a baggage compartment is formed partially above the engine compartment and rearwardly of the passenger compartment.

12. In a vehicle having a body of streamline configuration, front and rear seats in said vehicle, a driving motor for said vehicle having a plurality of dependent cylinders in the form of an inverted V, a transmission connected to said motor, a rear driving axle for said vehicle and a drive shaft extending from said transmission to said rear axle, driving said axle from below and extending through the angle between said V cylinders, said engine and transmission being positioned beneath the rear vehicle seat, whereby a relatively large baggage space is formed in said vehicle above said axle and rearwardly of said rear seats.

13. The combination according to claim 12, in combination with a rearwardly extending transverse partition extending from the bottom of the rear seats to the rear end of the vehicle, thereby forming with the sides, rear, floor and seats a totally enclosed compartment for the engine and transmission.

14. The combination according to claim 12, in combination with a rearwardly extending transverse partition extending from the bottom of the rear seats to the rear end of the vehicle, thereby forming with the sides, rear, floor and seats, a totally enclosed compartment for the engine and transmission, the height and width of said compartment being substantially equal to the height and width of said engine.

15. In a power vehicle, in combination, a body, a rear seat in said body, a space under said rear seat, closed at the top by the bottom of said seat, at the front by the seat riser, and at the bottom and sides by the body, and open at the rear, a motor and transmission positioned in said space, said motor having a plurality of cylinders arranged in the form of an inverted V, a driving axle for said vehicle, and a driving shaft connected at one end to said transmission, passing through the space between the cylinder legs and connected to said driving axle from below, the height and width of said motor being substantially equal to the height and width of said space.

WILHELM SEYERLE.